United States Patent [19]

Blair

[11] Patent Number: 5,237,138
[45] Date of Patent: Aug. 17, 1993

[54] SWITCH MOUNTING STRUCTURE

[75] Inventor: James F. Blair, St. Charles, Ill.

[73] Assignee: Saint Switch Inc., St. Charles, Ill.

[21] Appl. No.: 933,558

[22] Filed: Aug. 24, 1992

[51] Int. Cl.$^5$ ............................................. H01H 9/08
[52] U.S. Cl. ..................................... 200/293; 200/294
[58] Field of Search ..................... 200/293, 293.1, 294, 200/296; 248/27.3

[56] References Cited

U.S. PATENT DOCUMENTS

| Re. 28,030 | 6/1974 | Porter et al. | 200/296 |
|---|---|---|---|
| 559,474 | 5/1896 | Wirt | 200/293 |
| 4,227,238 | 10/1980 | Saito | 200/296 |
| 4,325,525 | 4/1982 | Iafret | 248/27.3 |
| 4,434,339 | 2/1984 | Ohashi | 200/296 |
| 4,496,791 | 1/1985 | Reichert et al. | 200/296 |

Primary Examiner—Renee S. Luebke
Attorney, Agent, or Firm—Wood, Phillips, VanSanten, Hoffman & Ertel

[57] ABSTRACT

Complexity and unreliability in a mounting structure for a switch (40) used to sense the position of another object is avoided in a switch and mounting structure that includes a switch body (46) with a movable switch plunger (48) extending from one end (50) of the body (46). The body (46) has an outwardly opening groove (52) and a mounting bracket (44) is adapted to be secured to a desired object (70). The mounting bracket (42) has a base section (98) for mounting purposes and two spaced legs (100,102) extending therefrom. A relatively large hole (76) is in one of the legs (102) and sized to receive the switch body (46) while a relatively small hole (78) is in the other of the legs (100) and sized to slidably receive the plunger (48). A resilient lock ring (44) is located in the groove (52) and in abutment with one of the legs (102) to hold the end (50) in firm abutment with the other of the legs (100) thereby securely mounting the switch body (46).

10 Claims, 2 Drawing Sheets

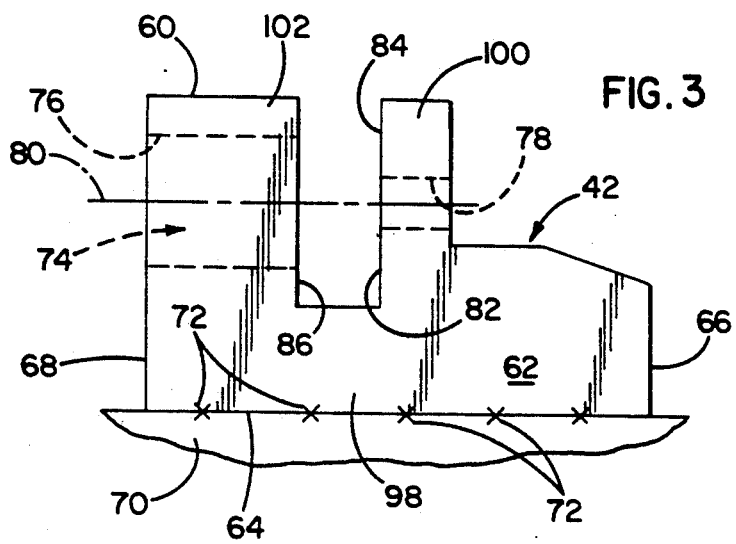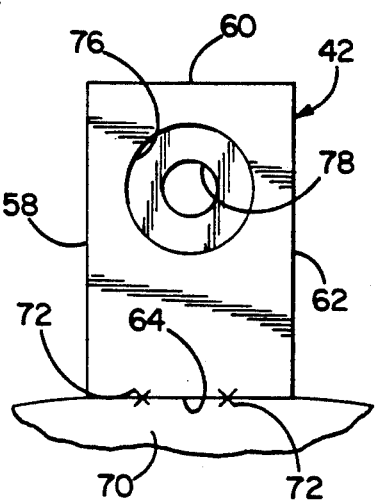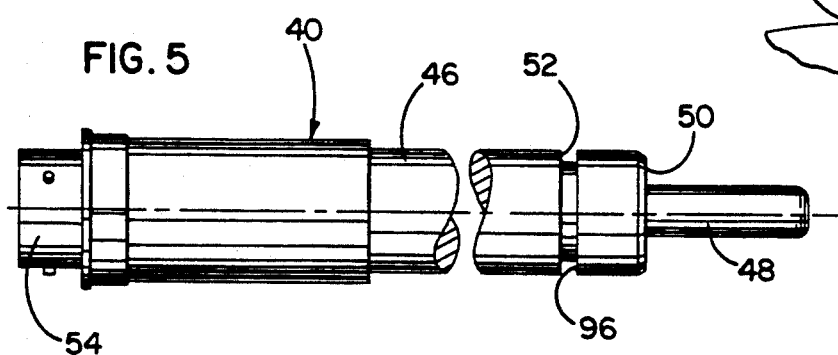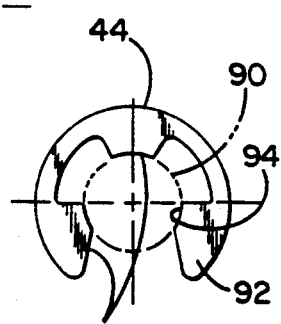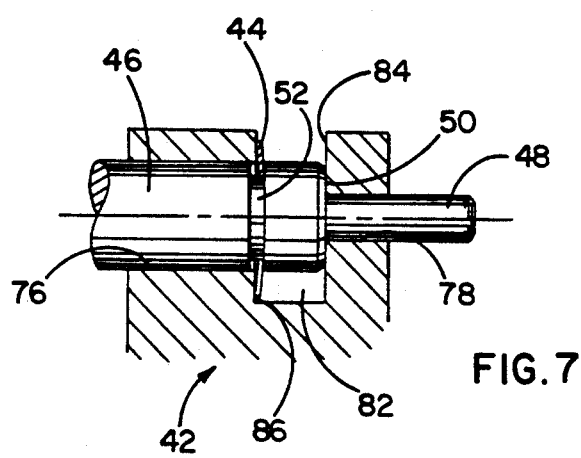

SWITCH MOUNTING STRUCTURE

FIELD OF THE INVENTION

This invention relates to the mounting of electrical switches, and more particularly, to the mounting of electrical switches that are to serve as sensors for sensing the position of some other object.

Background of the Invention

Electrical switches are frequently employed in sensing or interlock circuits. These switches are usually of relatively small size and include a movable actuator (sometimes referred to as a "plunger") which is disposed in the path of some movable object. When the switch actuator is contacted by the object, the switch condition changes, i.e., from open-to-closed or from closed-to-open, which in turn alters the sensing circuit. The circuit alteration may then be employed to provide an indication, cause some operation to occur, etc.

In the usual case, much care must be taken to properly adjust the location of the switch body with relation to the path of movement of the object to be sensed. In particular, it is necessary that the switch be so located that its actuator will be moved sufficiently to trip the switch whenever the object to be sensed is encountered. Mere contact between the object and the actuator frequently will be insufficient because there typically will be a need for a certain amount of actuator travel from the point at which the actuator is contacted by the object until the switch is tripped. It is likewise important that the switch not be tripped in response to small movements such as environmental vibration or shock because tripping in these cases would provide a false indication of the position of the object being sensed.

It is also necessary that once the initial adjustment is achieved, that it be maintained. clearly, if the initial adjustment cannot be maintained, the switch body may change its location as a result of occurrences in its operating environment, such as vibration, shock, or the like. When this occurs, the actuator will obviously move with the switch body and may move to a position whereat it cannot be tripped or where it is improperly tripped when no trip is desired.

In some conditions, the consequences of maladjustment, either due to poor initial adjustment or to a loss of adjustment during operation, can be extreme. For example, switches of this sort are employed in military vehicles for a variety of purposes. Typical purposes include the electrical firing of weapons and the control of interior light. The switches are employed to open control circuits to prevent operation if certain conditions are not correct. For example, in one type of military vehicle, when the driver's door or hatch is open, it may interfere with proper firing of a turret-mounted weapon. Thus, the door position is sensed with a switch that will open the electrical firing circuit to prevent firing when the door or hatch is open.

In the same vehicle, the interior lighting circuit may be interrupted when the rear door or hatch for the vehicle is opened for security purposes.

The conventional switches used to monitor hatch position do not have sufficient actuator travel distance to compensate for the wide variance in latch mechanism dimensions and alignment under the extreme condition encountered in a military operation. Frequently, the switch mounting brackets do not align the switch operators with tangs on the hatch latches with the consequence that the tangs may contact the sides or edges of the plungers instead of the ends of the plungers.

The result of these conditions is an unacceptable probability that weapon firing circuits will be interrupted. Consequently, there is an unreasonable likelihood that a weapon will not respond to a firing command by a gunner and in a combat situation, this could very well be a fatal flaw.

The operating crews for such vehicles, in at least one instance, have been aware of the deficiencies and have taken extraordinary measures to avoid the problems caused thereby. The crews have resorted to inserting coins between the switch actuator and the door latch at certain stations. At others, they have used rags or even T-shirts to tie components together so that relative movement that might improperly trip the switch can be avoided.

The primary source of the difficulty resides in two areas. For one, conventional switches all have a fixed operating point, that is, a point whereat a certain amount of relative movement of the switch actuator with respect to the switch body has occurred and will trip the switch. This inherent characteristic of conventional switches requires much care in the installation and adjustment of the same.

The second point of potential difficulty is in the mounting mechanism for the switches. It must be simple and yet capable of maintaining the initial adjustment, even under the worst of conditions.

In commonly assigned U.S. Pat. Nos. 4,778,960 and 4,940,864, the details of which are herein incorporated by reference, there are disclosed switches that are ideal for use in sensing circuits wherein the operating point of the switch is automatically adjusted to compensate for changes of the relative location of the switch and the object to be sensed. Consequently, the remaining problem resides in the nature of the mounting brackets and their complexity.

The present invention is directed to overcoming that difficulty.

SUMMARY OF THE INVENTION

It is the principal object of the invention to provide a new and improved switch and mounting structure therefor. More specifically, it is an object of the invention to provide a mounting structure for a switch, which mounting structure is extremely rugged and will reliably maintain a switch in a position in which it is initially installed and which is of simple construction, thereby avoiding the complexities of structural configurations found in the prior art.

An exemplary embodiment of the invention achieves the foregoing object in a switch and mounting structure which includes a switch body, and a movable switch plunger extending from a surface of the body. The plunger is of smaller size than the body so as to telescope thereinto and means are provided on the body for defining a shoulder that is at least partially about the plunger. A peripheral, outwardly opening groove is located on the body. There is also provided a mounting bracket adapted to be secured to an element to which the switch body is to be mounted and the bracket has a base section for mounting purposes and two spaced legs extending therefrom. A relatively large hole is in one of the legs and is sized to receive the switch body while a relatively small hole is in the other of the legs and is sized to slidably receive the plunger. The switch body is disposed in the larger hole with the shoulder abutting the other leg and the plunger in the small hole. A resilient lock ring is disposed in the groove and in substantial abutment with the one leg at a location between the legs to thereby securely mount the body within the bracket.

Preferably, the shoulder is defined by part of the body surface, and even more preferably, by an end thereof. In a highly preferred embodiment, the bracket is defined by a block of material, such as steel.

According to still another embodiment, the lock ring is a resilient E-ring. In a highly preferred embodiment, the E-ring is somewhat frustoconical and is distorted from its free state to exert a force against one of the sides of the bracket to securely locate the switch in the desired position.

In a highly preferred embodiment, the switch and mounting structure includes a switch body and a movable switch plunger extending from the body. Again, the plunger is of smaller size than the body so as to telescope thereinto. The body has a shoulder at least partially about the plunger and a peripheral, outwardly opening groove on the side of the shoulder removed from the plunger. A block of material is adapted to be secured to an element to which the switch body is to be mounted and a stepped passage extends through the block. The stepped passage has a relatively larger section and a relatively smaller section with the larger section being sized and shaped to snugly receive the body and the smaller section being sized and shaped to slidably receive the plunger. A slot is disposed in the block and is located to intersect the passage at the interface of the relatively large and relatively smaller sections of the passage. The slot has a width equal to or just greater than the distance between the groove and the shoulder and a first side through which the relatively smaller section opens and a second side through which the relatively larger section opens. The body is disposed in the relatively larger section with the plunger in the relatively smaller section, with the shoulder abutting the first side, and with the groove being within the slot closely adjacent to the second side. A lock ring is disposed in the slot and is located partially about the body and within the groove and abuts the second side to secure the body within the block.

In a highly preferred embodiment, the body has a cylindrical shape and the shoulder is defined by an end thereof. The stepped passage comprises a stepped bore.

A preferred embodiment also contemplates that the lock ring is an E-ring of slightly frustoconical shape as mentioned previously.

In a highly preferred embodiment, the slot opens to one exterior surface of the block and the block has another exterior surface opposite the one exterior surface which serves as a mounting surface for the block. In a highly preferred embodiment, the block has two additional exterior surfaces, each extending between and connecting the one and the another exterior surface and the slot additionally opens to the additional exterior surfaces.

Other objects and advantages will become apparent from the following specification taken in connection with the accompanying drawings.

DESCRIPTION OF THE DRAWINGS

FIG. 3 is a side elevation of a block used in the switch and mounting structure of the invention;

FIG. 4 is an elevational view of the block taken from the left of FIG. 3;

FIG. 5 is an elevational view of a switch that may be employed in the switch and mounting structure of the invention;

FIG. 6 is an elevation of a lock ring used in the invention; and

FIG. 7 is a sectional view of the completed switch and mounting structure.

DESCRIPTION OF THE PRIOR ART

Figure 1:
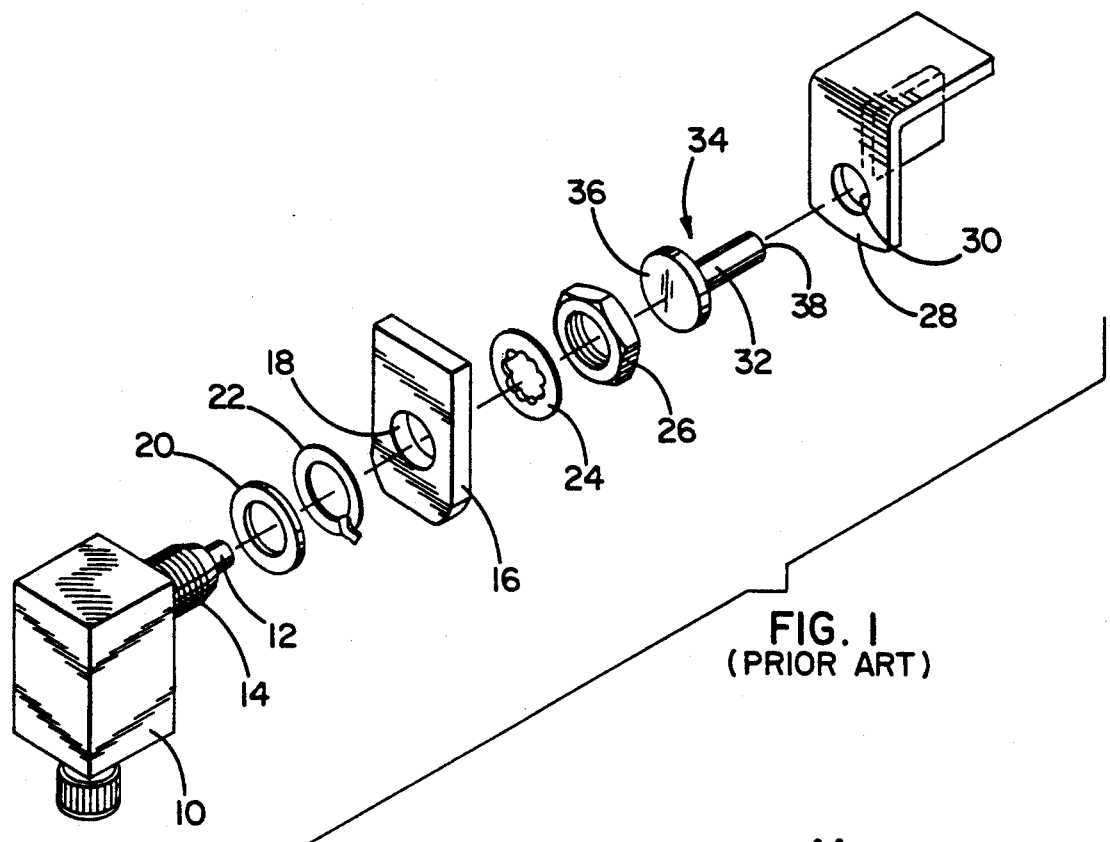
FIG. 1 is an exploded view of a prior art switch and mounting bracket construction.

A typical prior art switch mounting structure used in a military vehicle for the driver's door or notch is illustrated in FIG. 1 and is seen to include a conventional switch 10 having a movable operator or plunger 12 extending from a threaded nipple 14 thereon. The switch 10 is mounted to the vehicle via a plate 16 including a nipple receiving aperture 18. The plate 16 is welded to the vehicle in the desired location thereon.

On one side of the plate 16, and disposed about the nipple 14, is a threaded nut 20 and a keying washer 22. On the opposite side of the plate 16, a star washer 24 and a nut 26 are fitted to the nipple 14 to secure the switch 10 to the plate 16. The relative position of the actuator 12 in relation to the vehicle is determined by the relative location of the nuts 20 and 26 on the nipple 14.

Because the very nature of the structure is such that considerable misalignment between the actuator 12 and the object to be sensed may be present, a second mounting plate 28 having an aperture 30 is provided. The shank 32 of a plunger, generally designated 34, having an enlarged head 36 is slidably received in the aperture 30 and has an end 38 adapted to be engaged by the object to be sensed. The enlarged head 36 of the plunger 34 engages the operator 12 of the switch 10 and because the head 36 is enlarged, movement of the plunger 34 will be conveyed to the actuator 12 even when the longitudinal axes of the actuator 12 and the shank 32 are substantially displaced.

In any event, it will be appreciated that, in addition to the switch, the prior art configuration requires seven additional components, two of which must be separately mounted to the vehicle in at least nominal alignment with one another.

Furthermore, it will be appreciated that the nature of the mounting structure is such that under severe conditions, it will be relatively easy for adjustment to be lost. In the case of vibration or shock, such as might be encountered in a military vehicle that is traveling over rough terrain, and/or firing weaponry, the loosening of the nuts 20 and 26 can almost be guaranteed unless additional steps, such as wire wraps or the like, are to taken to prevent such loosening.

DESCRIPTION OF THE PREFERRED EMBODIMENT

Figure 2:
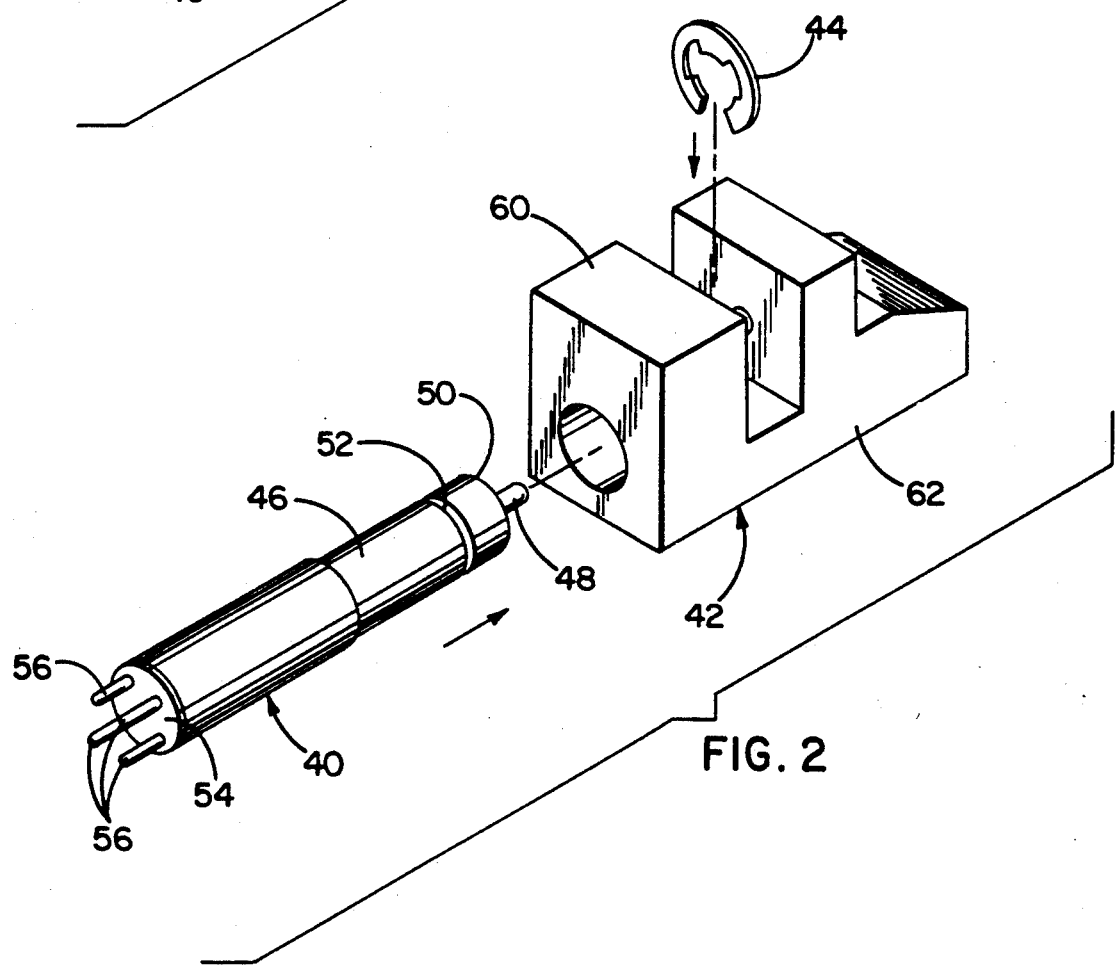
FIG. 2 is an exploded view of a switch and mounting structure made according to the invention.

A preferred embodiment of the invention is illustrated in FIGS. 2–7 inclusive, and with reference to FIG. 2 is seen to include only three components including a switch. More particularly, a switch, generally designated 40, of the type disclosed U.S. Pat. Nos. 4,778,960 and 4,940,864, the details of which are incorporated by reference, is employed along with a mounting block, generally designated 42, and a conventional, slightly frustoconical, resilient, E-ring 44.

Referring to FIGS. 2 and 5, the switch 40 includes a switch body 46 of generally cylindrical shape. A cylindrical plunger 48 of smaller size than the body 46 extends from one end or shoulder 50 of the body 46 and will, of course, when pushed, telescope into the body 46 as is well known. The end 50 of the body 46 serves as a shoulder for mounting purposes as will be seen and slightly spaced from the end 50 is a peripheral, radially outwardly opening annular groove 52. At the end 54 opposite the end 50, the body 46 may be provided with electrical contact pins 56 in a conventional fashion.

The block 42 will typically be made of a metal such as steel and will usually be generally in the form of a rectangular solid as illustrated. Thus, the same has sides 58, 60, 62 and 64 as viewed in FIGS. 3 and 4, and opposed ends 66 and 68. The side 64 is adapted to be secured to an element or object to which the switch body 46 is to be mounted. The object is somewhat schematically illustrated at 70 and the means of securement typically, but not always, will be a weld such as schematically illustrated at 72.

A stepped bore, generally designated 74, extends from end to end within the body 42. The stepped bore 74 is made up of one relatively large diameter section 76 and another, relatively small diameter section 78. It is noted that both of the bores 76 and 78 are coaxial, their mutual axis being shown at 80. In this respect, it is to be noted that the sections 76 and 78 of the stepped bore 74 may be formed in a single operation utilizing a stepped drill bit or the like and as a consequence, the desired coaxial alignment of the sections 76 and 78 is readily achieved.

A slot 82 is located in the block 42 and opens through the sides 58, 60 and 62. It extends into the block 42 generally transverse to the axis 80 and at a location that encompasses the interface between the large diameter section 76 and the smaller diameter section 78. Thus, the small diameter section 78 opens to one side 84 of the slot 82 while the large diameter section 76 opens to an opposite side 86 of the slot 82.

The width of the slot 82 is such that when the body 46 is disposed within the passage 74, the shoulder 50 may be abutted against the side 84 of the slot 82 and the groove 52 on the body 46 will just enter the slot 82 to be nominally aligned with the side 86 or, at least, closely adjacent thereto. That is, the distance between the slot 52 and the shoulder 50 is equal to or just less than the width of the slot 82.

Turning now to FIG. 6, it will be seen that the lock ring or E-ring 44 is sized to tightly embrace the inner diameter of the groove 52 which is shown in dotted lines at 90. The E-ring 44 is, as mentioned previously, slightly frustoconical and is in all respects conventional. It will typically be made of any suitable resilient metal.

Turning now to FIG. 7, the assembled switch and mounting structure is illustrated in section. More specifically, the switch body 46 has been disposed within the large diameter section 48 of the passage 74 and the shoulder 50 brought into abutment with the side 84 of the slot 82. The plunger 48 extends out of the block 42 through the small diameter section 78 which is just sufficiently larger than the plunger 48 so that the latter may slide within the former when its exposed end is engaged by the object to be sensed.

The groove 52 is nominally aligned with the side 86 of the slot 82 and the E-ring installed within the groove 54 and stressed from its free state, which is to say, it is made more nearly planar. As a consequence, its outer periphery 92 will be abutting the side 86 of the slot 82 while tabs 94 on its inner periphery will be received in the groove 42 and reacting against a side wall 96 of the groove, which side wall 96 is nearest the shoulder 50.

As a consequence, the shoulder 50 is forced tightly against the surface 84 while the E-ring 44 itself tends to clamp the body 46 tightly to the side 86.

In some instances, a mounting element other than a block 42 may be employed. Generally speaking, however, the mounting element will include a base-like section 98 for mounting purposes from which extends two spaced legs 100 and 102 just as in the block 42. Of course, in the exemplary embodiment, the legs 100 and 102 are formed when the slot 82 is located in the block 42 but they could be formed by any of a variety of other processes that will be apparent to those skilled in the art.

It will be appreciated from the foregoing description of the invention that a number of advantages accrue. The number of pieces requiring assembly is considerably reduced over the prior art and the matter of welding and aligning two pieces as required in the prior art is totally avoided through the use of a block. The use of the stepped bore assures that both parts of the bore will be in alignment so as to facilitate proper receipt of the switch body and the actuator in a manner that prevents binding and excessive wear due to mis-alignment. The system is easily assembled by virtue of the use of the E-ring and, through use of a switch made according to either of the previously identified patents, no field adjustment is required. Furthermore, there is no adjustment required if a switch requires changing. At the same time, the mounting structure may be made extremely rugged and durable.

I claim:

1. A switch and mounting structure comprising:

a switch body;

a movable switch plunger extending from said body, said plunger being of smaller size than said body so as to telescope thereinto;

said body having a shoulder at least partially about said plunger and a peripheral, outwardly opening groove remote from said plunger;

a block of material adapted to be secured to an element to which the switch body is to be mounted;

a stepped passage extending through said block having a relatively larger section and a relatively smaller section;

said relatively larger section being sized and shaped to snugly receive said body;

said relatively smaller section being sized and shaped to slidably receive said plunger;

a slot in said block and located to intersect said passage at an interface of said relatively larger and relatively smaller sections, said slot having a width about or just greater than the distance between said groove and said shoulder and a first side through which said relatively smaller section opens and a second side through which said relatively larger section opens;

body being disposed in said relatively larger section with (a) said plunger in said relatively smaller section, (b) said shoulder abutting said first side, and (c) said groove being within said slot closely adjacent said second side; and a lock ring in said slot and located partially about said body and within said groove and abutting said second side to secure said body within said block.

2. The switch and mounting structure of claim 1 wherein said body has a cylindrical shape and said shoulder is defined by an end thereof; said stepped passage comprising a stepped bore.

3. The switch and mounting structure of claim 1 wherein said lock ring is an E-ring of slightly frustoconical shape to exert a biasing force against said second side.

4. The switch and mounting structure of claim 1 wherein said slot opens to one exterior surface of said block, and said block has another exterior surface opposite said one exterior surface; said another exterior surface serving as a mounting surface for said block.

5. The switch and mounting structure of claim 4 wherein said block has two additional exterior surfaces, each extending between and connecting said one and said another exterior surfaces; and said slot additionally opens to said additional exterior surfaces 6. A switch and mounting structure comprising:
a cylindrical switch body;
a movably cylindrical switch plunger extending from one end of said body, said plunger being of smaller size than said body so as to telescope thereinto;
said body having a shoulder at said one end and surrounding said plunger and a peripheral, outwardly opening groove in its cylindrical surface spaced from but adjacent said shoulder;
a block of material generally in the form of a rectangular solid adapted to be secured to an element to which the switch body is to be mounted;
a stepped cylindrical bore extending through said block having a relatively larger bore section and a relatively smaller bore section, said sections being concentric sections;
said relatively larger section being sized and shaped to snugly receive said body;
said relatively smaller section being sized and shaped to slidably receive said plunger;
a slot in said block and located to intersect said passage at the interface of said relatively larger and relatively smaller sections, said slot having a width equal to or just greater than the distance between said groove and said shoulder and a first side through which said relatively smaller section opens and a second side through which said relatively larger section opens, said slot further opening to three adjacent sides of said block;
said body being snugly disposed in said relatively larger section with (a) said plunger in said relatively smaller section, (b) said shoulder abutting said first side, and (c) said groove being within said slot closely adjacent said second side; and
a resilient, frustoconical E-ring in said slot and located partially about said body and within said groove and forcibly abutting said second side to secure said body within said block.

7. A switch and mounting structure comprising
a switch body;
a movable switch plunger extending from one end of said body, said plunger being of smaller size than said body so as to telescope thereinto;
said body having an outwardly opening groove;
a mounting bracket adapted to be secured to an element to which the switch body is to be mounted, said bracket having a base section for mounting purposes and two spaced legs extending therefrom;
a relatively large hole in one of said legs and sized to receive said body;
a relatively small hole in the other of said legs and sized to slidably receive said plunger;
said body being disposed in said larger hole with said one end abutting said other leg and said plunger in said small hole; and
a resilient lock ring in said groove and in abutment with said one leg at a location between said legs to thereby securely mount said body within said bracket.

8. A switch and mounting structure comprising:
a switch body;
a movable switch plunger extending from a surface of said body, said plunger being of smaller size than said body so as to telescope thereinto;
means on said body defining a shoulder at least partially about said plunger and a peripheral, outwardly opening groove spaced therefrom;
a mounting bracket adapted to be secured to an element to which the switch body is to be mounted, said bracket having a base section for mounting purposes and two spaced legs extending therefrom;
a relatively large hole in one of said legs and sized to receive said body;
a relatively small hole in the other of said legs and sized to slidably receive said plunger;
said body being disposed in said larger hole with said shoulder abutting said other leg and said plunger in said small hole; and
a resilient lock ring in said groove and in abutment with said one leg at a location between said legs to thereby securely mount said body within said bracket.

9. The switch and mounting structure of claim 8 wherein said shoulder is defined by said surface.

10. The switch and mounting structure of claim 8 wherein said bracket is defined by a block of material.

* * * * *